US007913243B2

(12) United States Patent
Axnix et al.

(10) Patent No.: US 7,913,243 B2
(45) Date of Patent: Mar. 22, 2011

(54) METHOD AND SYSTEM FOR GENERATING AND APPLYING PATCHES TO A COMPUTER PROGRAM CONCURRENTLY WITH ITS EXECUTION

(75) Inventors: Christine Axnix, Steinenbronn (DE); Michael Mueller, Leonberg (DE); Hartmut Penner, Hildrizhausen (DE)

(73) Assignee: International Business Machines Corporation, Armonk, NY (US)

( * ) Notice: Subject to any disclaimer, the term of this patent is extended or adjusted under 35 U.S.C. 154(b) by 1277 days.

(21) Appl. No.: 11/472,118

(22) Filed: Jun. 21, 2006

(65) Prior Publication Data

US 2007/0006201 A1 Jan. 4, 2007

(30) Foreign Application Priority Data

Jun. 21, 2005 (EP) .................................. 05105444

(51) Int. Cl.
*G06F 9/44* (2006.01)
(52) U.S. Cl. ...................................................... 717/168
(58) Field of Classification Search .................. 717/168
See application file for complete search history.

(56) References Cited

U.S. PATENT DOCUMENTS

| 5,321,844 A | 6/1994 | Schwagmann | 395/800 |
| 5,481,713 A | 1/1996 | Wetmore et al. | 395/700 |
| 5,805,887 A * | 9/1998 | Wang | 717/100 |
| 5,938,766 A | 8/1999 | Anderson et al. | |
| 6,298,434 B1 * | 10/2001 | Lindwer | 712/209 |
| 7,421,710 B2 * | 9/2008 | Qi et al. | 719/321 |
| 2004/0107416 A1 * | 6/2004 | Buban et al. | 717/170 |

FOREIGN PATENT DOCUMENTS

| EP | 042251 B1 | 10/1996 |
| EP | 0757314 A1 | 2/1997 |

* cited by examiner

*Primary Examiner* — Philip Wang
(74) *Attorney, Agent, or Firm* — Dennis Jung, Esq.; Blanche E. Schiller, Esq.; Heslin Rothenberg Farley & Mesiti P.C.

(57) ABSTRACT

A method, a computer program product, and a system for generating and applying patches to a computer program concurrently with its execution. It provides full support for function pointers, transparent to the programmer and nearly transparent to the concurrent loader. A reference to a function pointer is translated into a sequence of processor instructions called function descriptor instead of translating it into an address. The purpose of the function descriptor is to jump to the memory location of the sequence of instructions generated by the compiler for the procedure referenced by the function pointer. The function descriptor is masked as a static data variable and therefore preserved during the application of a concurrent patch. The address for the jump to the procedure is updated by the regular relocation process during the application of a concurrent patch.

18 Claims, 12 Drawing Sheets

__US 7,913,243 B2__

METHOD AND SYSTEM FOR GENERATING AND APPLYING PATCHES TO A COMPUTER PROGRAM CONCURRENTLY WITH ITS EXECUTION

CROSS-REFERENCE TO RELATED APPLICATION

This application claims the priority benefit under 35 U.S.C. §119 of European patent application 05105444.3, filed Jun. 21, 2005, and incorporated herein by reference.

BACKGROUND OF THE INVENTION

This invention relates to a method of generating and applying patches to a computer program code concurrently with its execution on a computer system, a computer system for executing the method and a computer program product containing code to execute the method.

Computer users have long had a need for continuous non-disrupted operation. Therefore methods have been developed to modify and update computer programs concurrently with their execution with new code (a patch) that is loaded into the computer.

Typically, a computer program consists of different sections such as executable machine code, static data variables, and temporary data. The executable code can be comprised of various procedures, which are called via their address in memory. A static data variable is kept valid in the same memory address during the entire execution of the program. In contrast, a temporary data variable (and its location in memory) is only valid during certain periods of the program execution, e.g. while a specific procedure executes.

A patch to a computer program code replaces either parts of or the complete computer program code. Methods that replace only parts of a computer program code are described in the U.S. Pat. No. 5,321,844, the European patent 0,492,251 B1, and the European patent application 0,757,314 A1.

The main processor firmware in existing IBM® eServer® zSeries® systems can be patched concurrently such that the complete computer program code is replaced. The method used there assumes that it is possible to replace the currently running code with new code at a time where the temporary data are irrelevant for the program execution. Especially, the method allows preserving the static variables and their content.

The concurrent patch operation is executed by a concurrent loader process which runs as a background task. The concurrent loader loads new computer program code (so called code load) into the computer system memory and prepares this code for execution. Once the loading and preparation is completed, the concurrent loader brings the computer program to be patched into a state where temporary data can be ignored during the concurrent patch operation. Finally, it switches from the old code to the new code in an atomic operation. This entire procedure is called the application of a concurrent patch.

The preparation of the new program code for its execution consists in resolving and adapting all address references in the code load to the addresses of the memory section into which the code is loaded. This step performed by the concurrent loader is also known as relocation. Therefore a standard linker program can be used for the generation of the program code that does not need special knowledge about the concurrent patch procedure. This makes the concurrent patch application transparent to the programmer: There is no need to know how it works when implementing the program. In fact, there is no difference for a code load that can be used for a concurrent patch application to one which can be loaded by a loader that is not a concurrent loader.

The format of the computer program code and the format of the code load used for the concurrent patch is the standard ELF (Executable and Linking Format) format and any linker program that supports the ELF format can be used. A code load in the ELF format can be used for a concurrent patch and it could be loaded by any zSeries-compliant loader that supports the ELF format, which is not necessarily a concurrent loader.

But the main processor firmware in existing IBM eServer zSeries products does not fully support the use of function pointers. A function pointer is an element of many high-level programming languages (e.g. C and C++), which can be used instead of a procedure name literal string in order to refer to a specific procedure. Function pointers allow algorithms using procedures as manipulation objects.

Usually, function pointers are translated into the address of the referenced procedure by the programming language compiler. Especially, the content of a data variable can be a function pointer. Since static data variables are preserved during the concurrent patch application, static data variables containing the address of a procedure are preserved as well. However, there is no guarantee that the address of the referenced procedure is still the same after the concurrent patch application. Between the assignment of an address of a procedure to a function pointer and the actual usage of the function pointer one or more concurrent patch operations could have changed the address of the procedure. The content of the function pointer does not necessarily point to the correct address of the procedure after the application of a concurrent patch.

An address does not provide more information other than pointing to a memory location, and the content stored in this memory location cannot be identified to be a procedure, a data variable, a pure number, or even an instruction of the processor. A procedure is translated in a sequence of processor instructions by the compiler. A given sequence of processor instructions cannot be related to a procedure later on.

The U.S. Pat. Nos. 5,481,713 and 5,938,766 disclose non-concurrent patch methods replacing parts of a computer program code only. These methods support function pointers. The function pointers are kept in a special memory area called vector table. The vector table is maintained by a loader program that is responsible for the patch application.

The support for the vector table is added to a code load transparently for the programmer in a special code load creation step called vectorisation. The vectorisation manipulates the object files that are produced by a compiler or assembler. The manipulated object files are then processed by a linker program as usual in order to generate a code load that can be applied as a patch by the loader.

However, this approach does not disclose means to support function pointers as the content of variables, especially not of static variables that are preserved during a concurrent patch application. Another disadvantage is that it requires significant modifications to the loader program, which is a critical component since a failure in the loader program can make the entire computer system unusable.

SUMMARY OF THE INVENTION

It is therefore an object of the present invention, to provide a method to generate and apply patches to a computer program concurrently with its execution that is improved over the prior art and a corresponding computer system and a computer program product.

The present invention provides full support for function pointers, transparent to the programmer and nearly transparent to the concurrent loader.

The advantages of the invention are accomplished by translating a reference to a function pointer for a procedure to a reference to a special sequence of instructions instead of translating it to an address of a procedure. The sequence of instructions is called function descriptor and can be generated by the compiler, the linker, or a dedicated post-processing tool. By loosing the transparency advantage also the concurrent loader can be adapted to generate function descriptors. The purpose of the function descriptor is to jump to the memory location of the sequence of instructions generated by the compiler for the procedure referenced by the function pointer. This memory location is identified within the function descriptor by a name unambiguously corresponding to the referenced procedure.

The function descriptors are stored in the section of static data variables. Therefore a function descriptor is preserved during the application of a concurrent patch. The target address for the jump to the procedure is updated by the regular relocation process during the application of a concurrent patch.

BRIEF DESCRIPTION OF THE DRAWINGS

For the present invention, and the advantages thereof, reference is now made to the following descriptions taken in conjunction with the accompanying drawings.

DETAILED DESCRIPTION

Introduction

Figure 1:
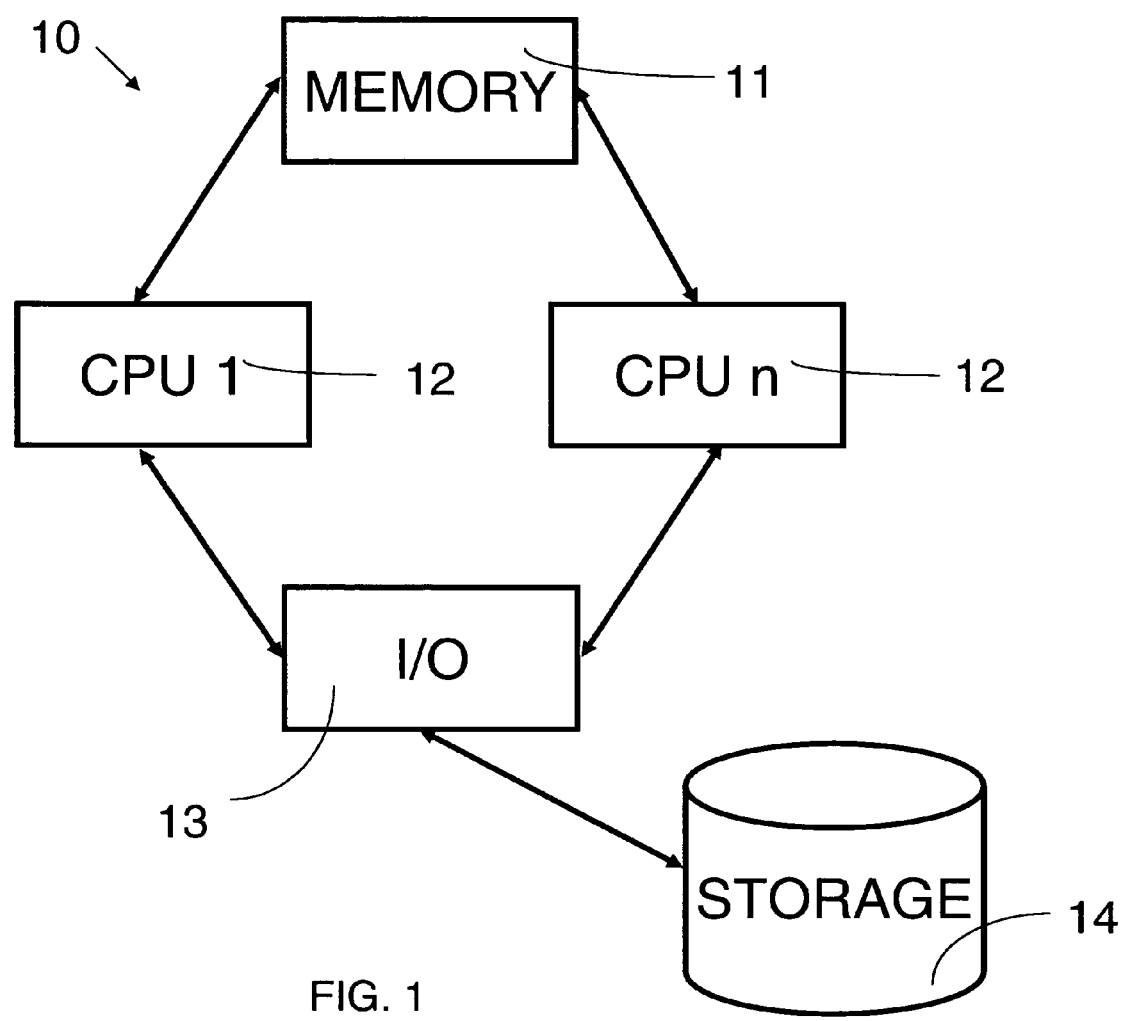
FIG. 1 is a block diagram of a computer system in which the invention can be implemented.

FIG. 1 illustrates a computer system 10 in which the present invention can be used. A shared memory 11 is coupled to one or more Central Processing Units (CPUs) 12. These CPUs 12 are also coupled to an I/O subsystem 13. A storage device 14 is accessible for the CPUs 12 via the I/O subsystem 13. The memory 11 is divided in memory words which have a unique address used by the CPUs 12 to access their content.

The computer system 10 can execute multiple computer programs. This can be achieved running an operating system kernel capable to support multitasking or multiprocessing. For this invention it is sufficient that a simple dispatching program is present, which is capable to distribute multiple work requests to the CPUs 12, which can have different priorities. The dispatcher is choosing the next work request from a queue of work requests based on the priorities of the requests in the queue. The work requests itself are computer program code each.

Usually, a computer program is implemented in a high-level programming language such as C or PL-8. The computer program code that can be loaded on the computer system 10 by a normal or a concurrent program loader is then generated from the high-level language implementation via a compiler and a linker program. Typically, the output of such a linker program is a Position Independent Code, which needs to be translated in Position Dependant Code when the code is loaded into the computer system memory 11. For example, the ELF format supports both variants.

Figure 2A:
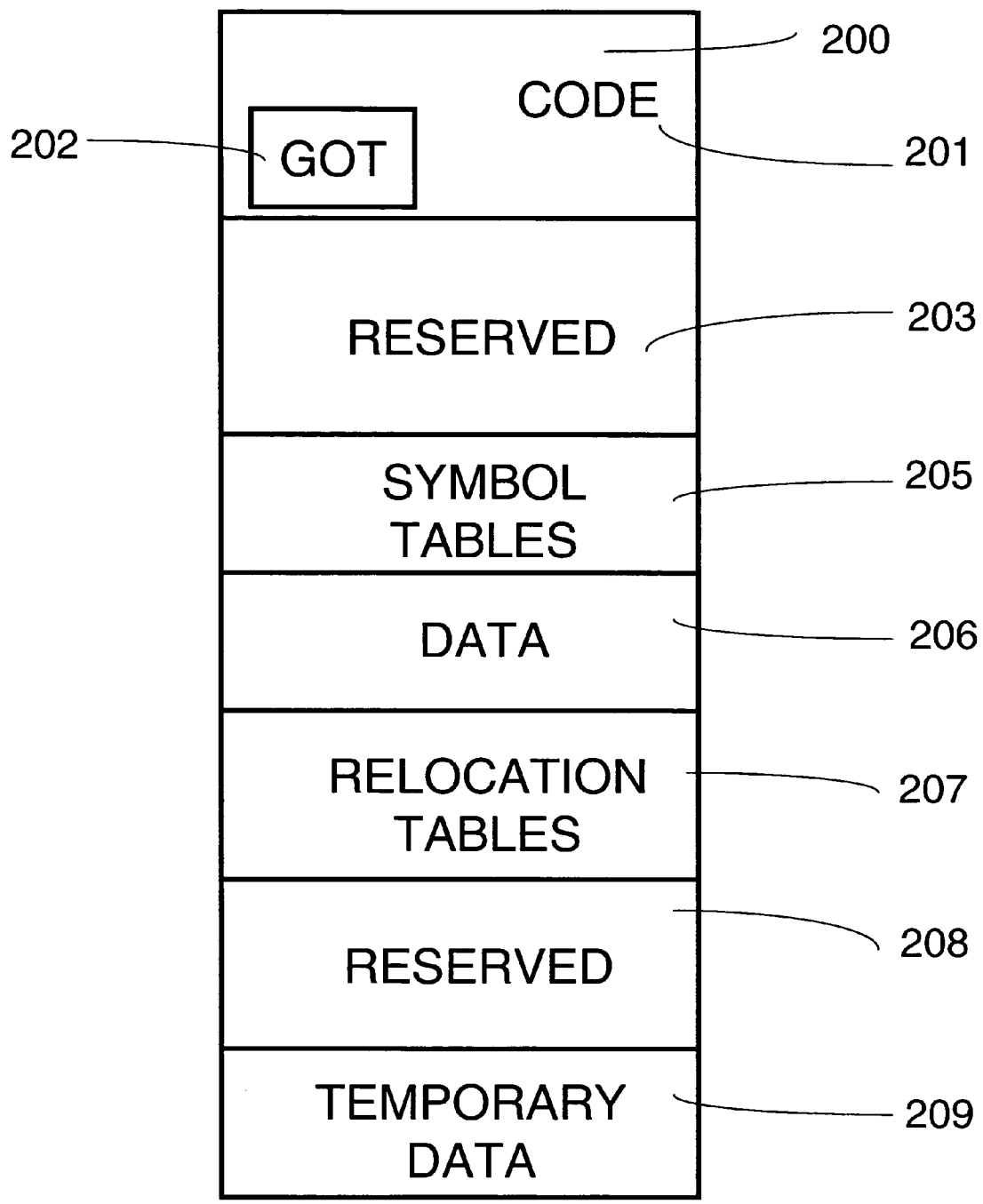
FIG. 2a is a schematic representation of computer program code in the memory of the computer system of FIG. 1 before any concurrent patch is applied.

Referring to FIG. 2a, the computer program code 200 initially loaded in the memory 11 of a computer system 10 comprises a section for the currently executed machine code 201 that can be executed by the CPUs 12, a subsection of a global offset table (GOT) 202. Another reserved section 203 is used by the concurrent loader for the new machine code of a concurrent patch, a section for the symbol tables 205, a section for the static data variables 206, another section for the relocation tables 207, and a section 208 of reserved space. The section for the relocation tables 207 comprises of several relocation tables. For this invention the following are important: A relocation table for the machine code 201, the relocation table for the GOT 202 of the machine code 201, and the relocation table for the static data variables 206.

Figure 3:
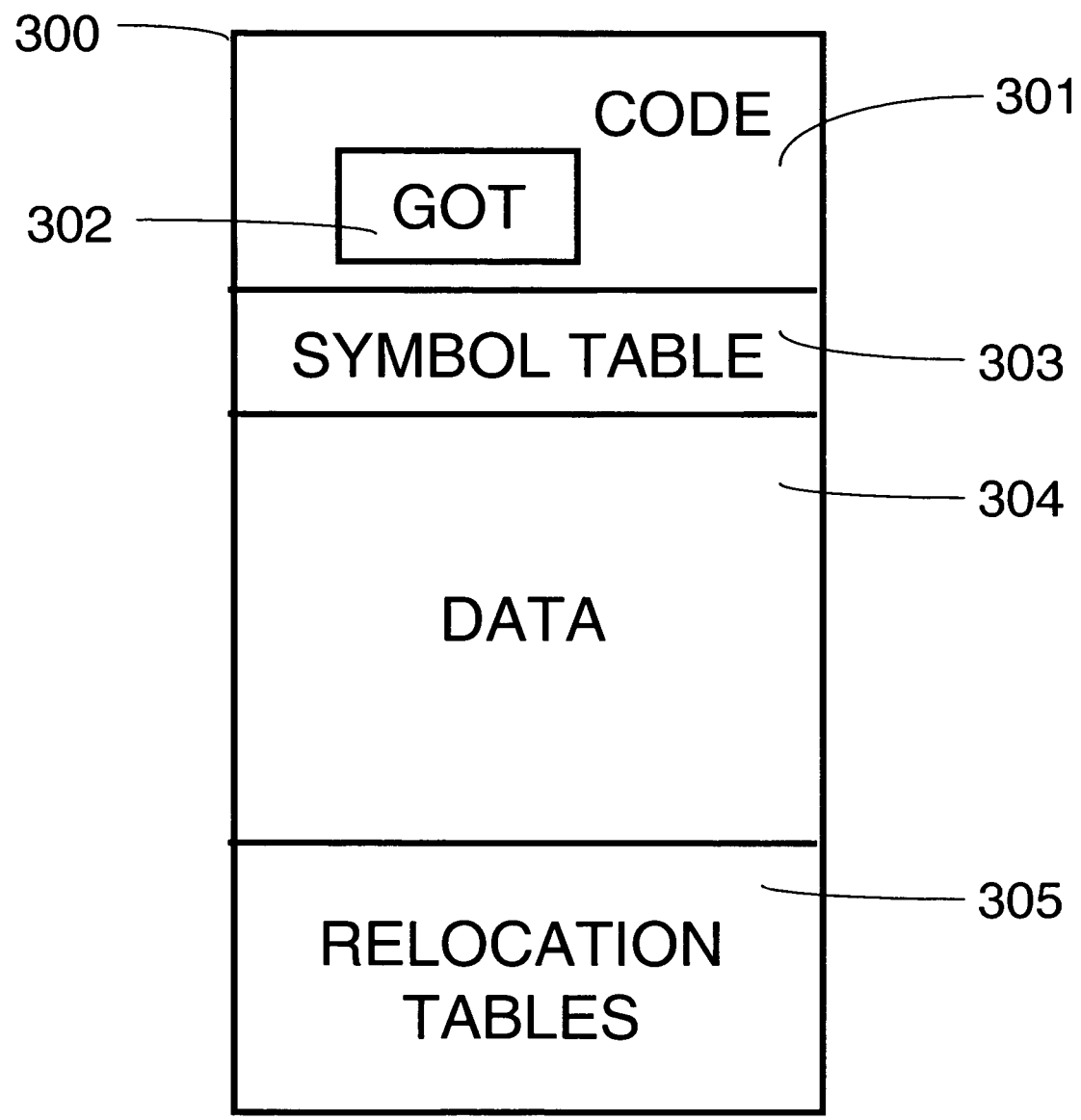
FIG. 3 is a schematic representation of a code load that can be used for a concurrent patch of the computer program running on the computer system of FIG. 1.

As shown in FIG. 3, the content of a code load 300 that can be used for a concurrent patch as stored on a storage device 14 consists of a section of machine code 301 that can be executed by the CPUs 12 including a subsection of a GOT 302, a section for a symbol table 303, a section 304 for the static data variables, and a section for the relocation tables 305. The content of a static variable stored in the data section 304 can be either initialised with a constant value that was known at the time when the code load was created by a translation program from its sources, or it can be initialised with a reference to another static variable, or it can be not initialised. When it is not initialised, an initialisation routine can be provided in the code section 301 of the code load 300. If such a routine is not provided, then the variable needs to be initialised during the normal program execution. Among the relocation tables 305, there is one relocation table for the code section 301, one for the GOT 302 of the code section 301, and one for the data section 304.

Figure 4:
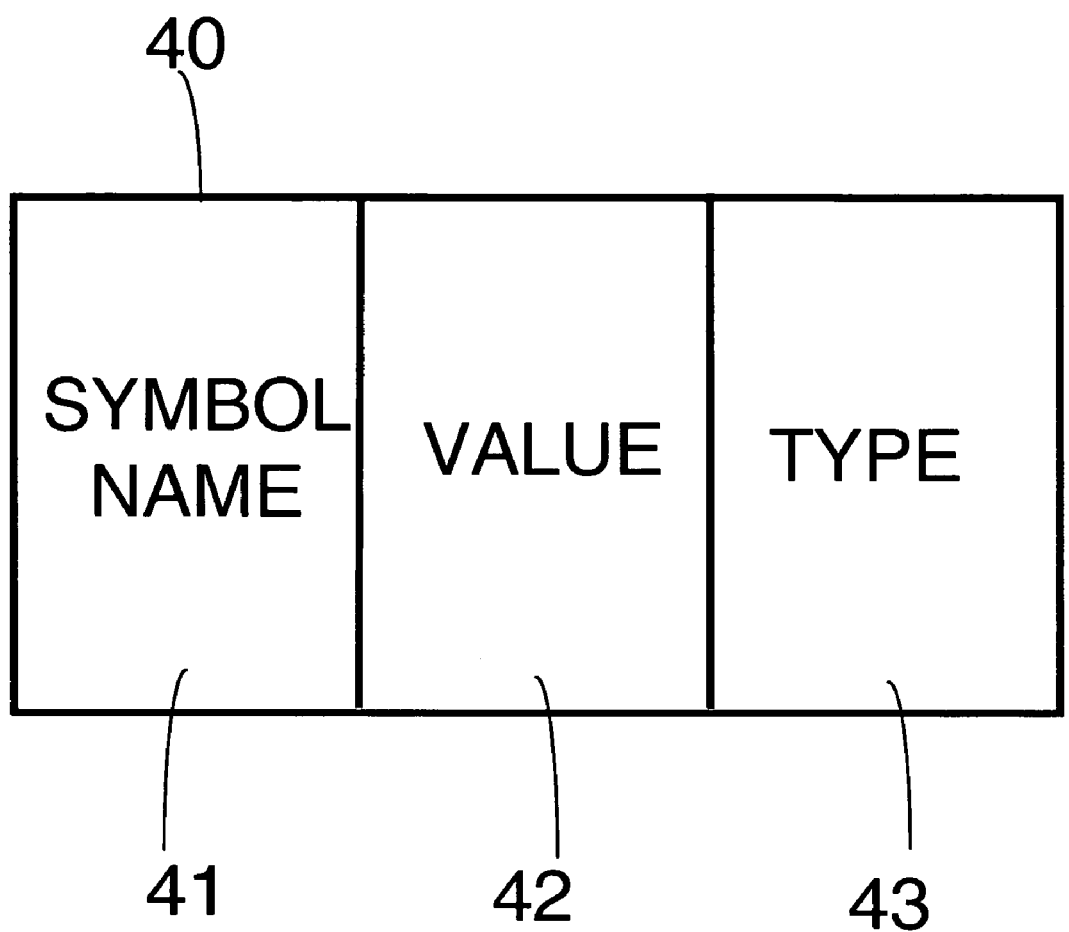
FIG. 4 is a schematic representation of an entry of a symbol table as used in FIGS. 2a, 2b, and FIG. 3.

The symbol tables 205 and 303 contain a list of all the procedures and static variables of the computer program code 200 and the code load 300, respectively. This list can be implemented as an array for example. An entry 40 of the symbol table is shown in FIG. 4 (restricted to the characteristics important for this invention) and also called a symbol. It consists of a symbol name 41, a value field 42, and a type 43. The symbol name 41 of a symbol 40 must be unique for every entry in the symbol tables 205 and 303. The type 43 specifies if the entry 40 relates to a procedure or to a static data variable. The content of the value field 42 is the memory address where the symbol (the procedure or static variable that is associated to this symbol table entry 40) is located in the computer memory 11.

Figure 5:
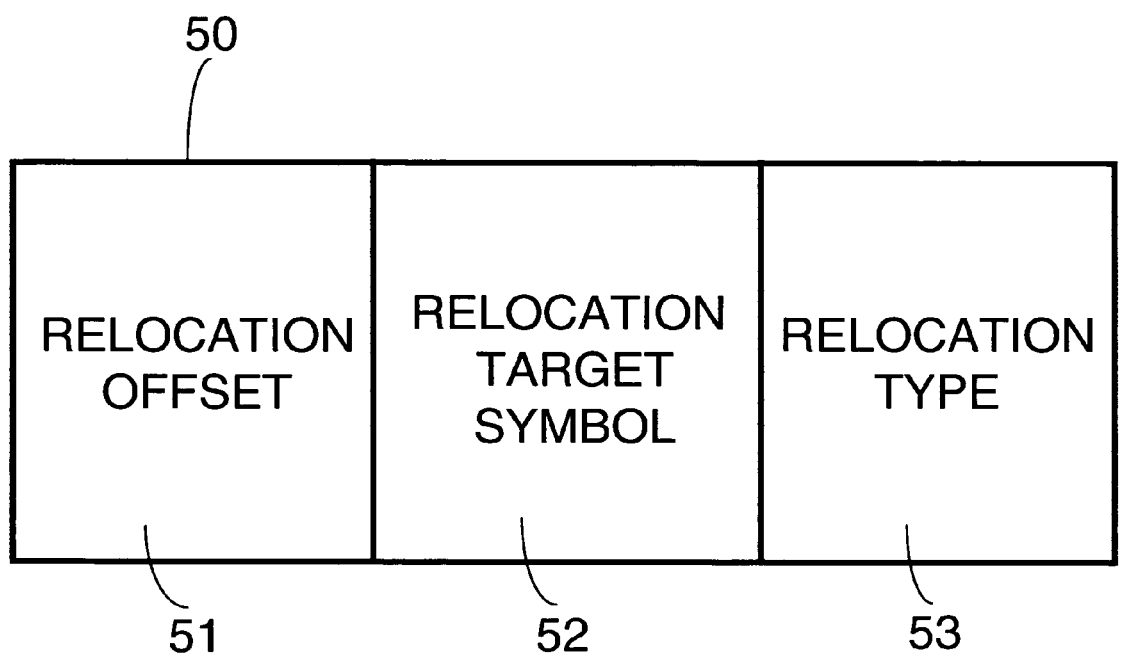
FIG. 5 is a schematic representation of an entry of a relocation table as used in FIGS. 2a, 2b, and FIG. 3.

The relocation tables contain a list of address constants that must be recalculated when the code or data is copied to another place in the computer memory 11 than pre-calculated by the linker program when it was generating the code load 300. An entry 50 of the relocation table is shown in FIG. 5 (restricted to the characteristics important for this invention). It consists of an relocation offset 51, specifying the memory address of the address constant that needs to be recalculated, information about the relocation target symbol 52 that the address constant points to, and the relocation type 53 which can, for example, specify whether the reference to the target symbol is an absolute or relative address reference.

Accesses from the code to the static data variables can be either direct accesses, or, for position independent code, indirect accesses via a GOT. A GOT is an array of memory addresses as used by the CPUs 12 to access a word in the memory 11 of the computer system 10. An entry in the GOT corresponds to a symbol in the symbol table. The relocation table for the GOT specifies which entry in the GOT corresponds to which symbol. For an indirect access of a static variable via the GOT, the code loads the pointer to the static data variable from the GOT.

Concurrent Patch Application

Figure 2B:
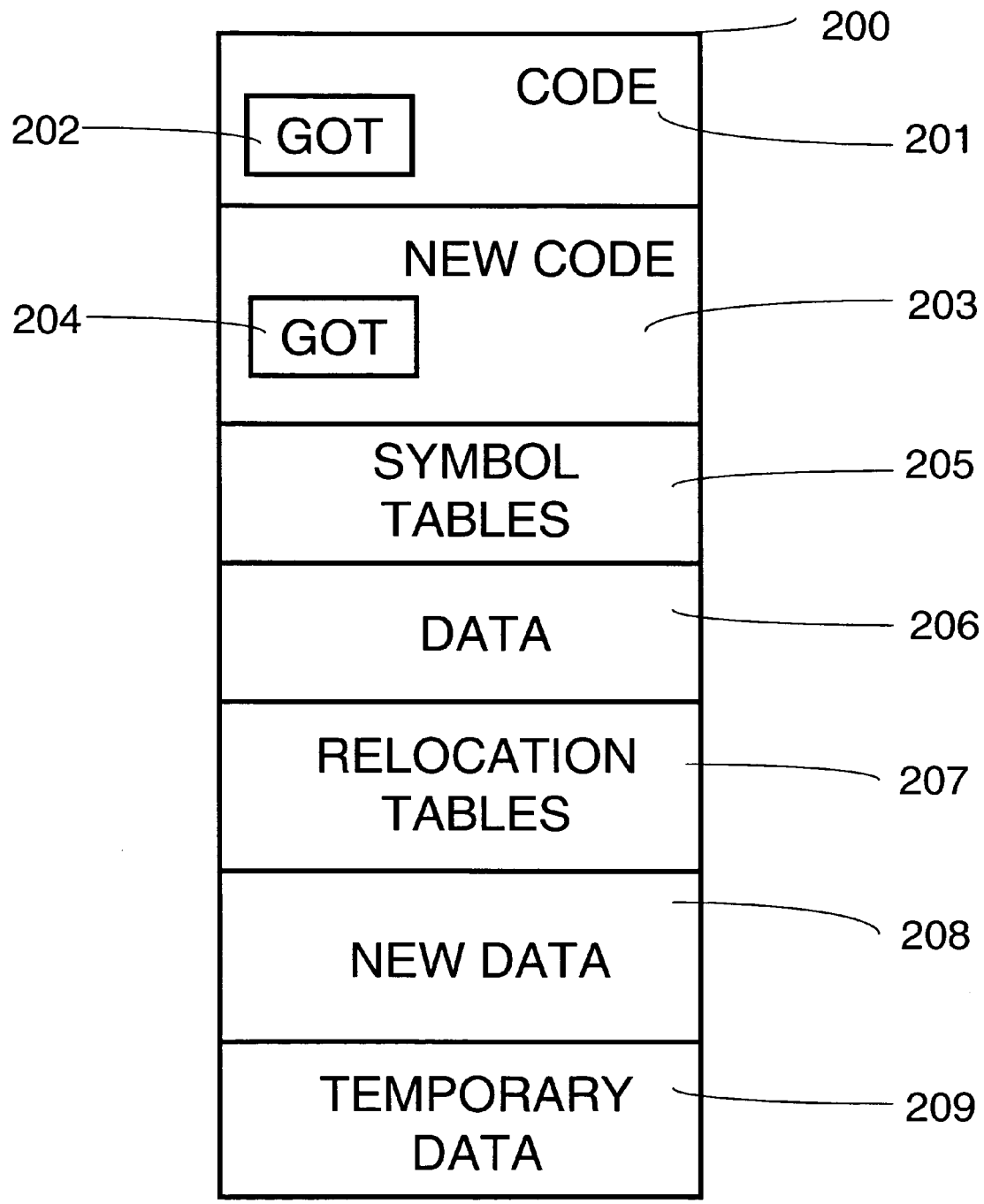
FIG. 2b is the same representation as FIG. 2a, except that the application of the concurrent patch has started.
Figure 6A:
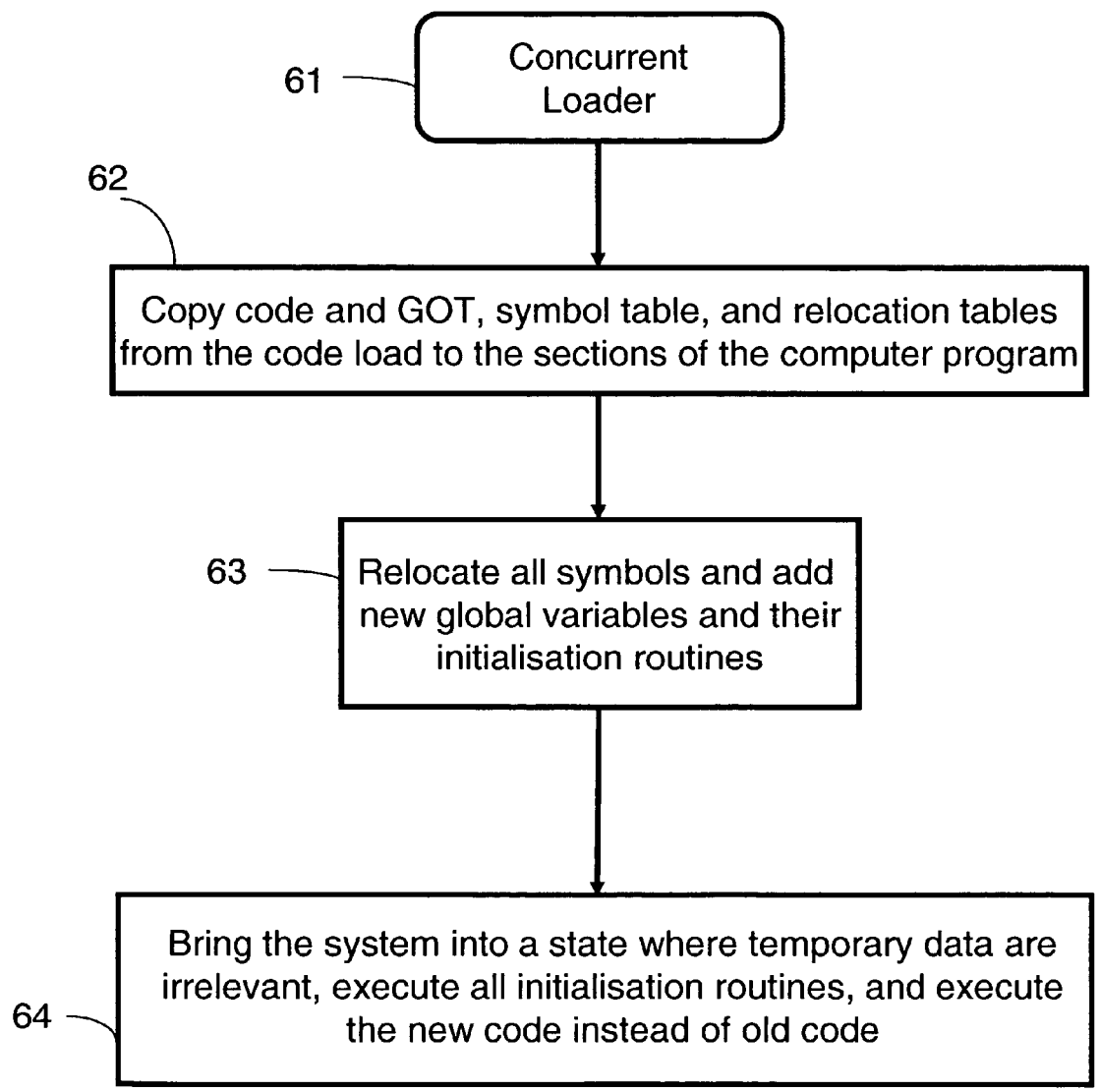
FIG. 6a shows the steps performed by the concurrent loader when applying concurrent patches to the computer program code.

The concurrent loader is running as a background task on the computer system 10. FIG. 6a shows the steps performed by the concurrent loader 61 when applying a concurrent patch. In the first step 62 the section of machine code 301 including its GOT section 302 is copied from the code load 300 on storage 14 to the section 203 reserved for new machine code in the computer program code 200. FIG. 2b shows the section for the new code 203 and the subsection for its GOT 204. Then also the symbol table 303 of the code load is copied to the section of the symbol tables of the computer program code 205 preserving the existing symbol table. This is important since the original symbol table is in use by the computer program code 200 and as the concurrent loader is running as a background process changes in parallel are complicated.

The relocation tables 305 of the code load 300 are added to the relocation tables 207 of the computer program code 200 as follows: The relocation tables for the machine code 301 and for its GOT 302 replace the relocation tables for the machine code 201 and its GOT 202 in the section of the relocation tables 207. This is possible since the relocation tables are no more needed for the execution of the machine code 201 (those are needed for the initial load of the computer program code 200 only). The relocation table for the static data section 304 is ignored in this step, preserving the original relocation table for the static data section 206.

Figure 7:
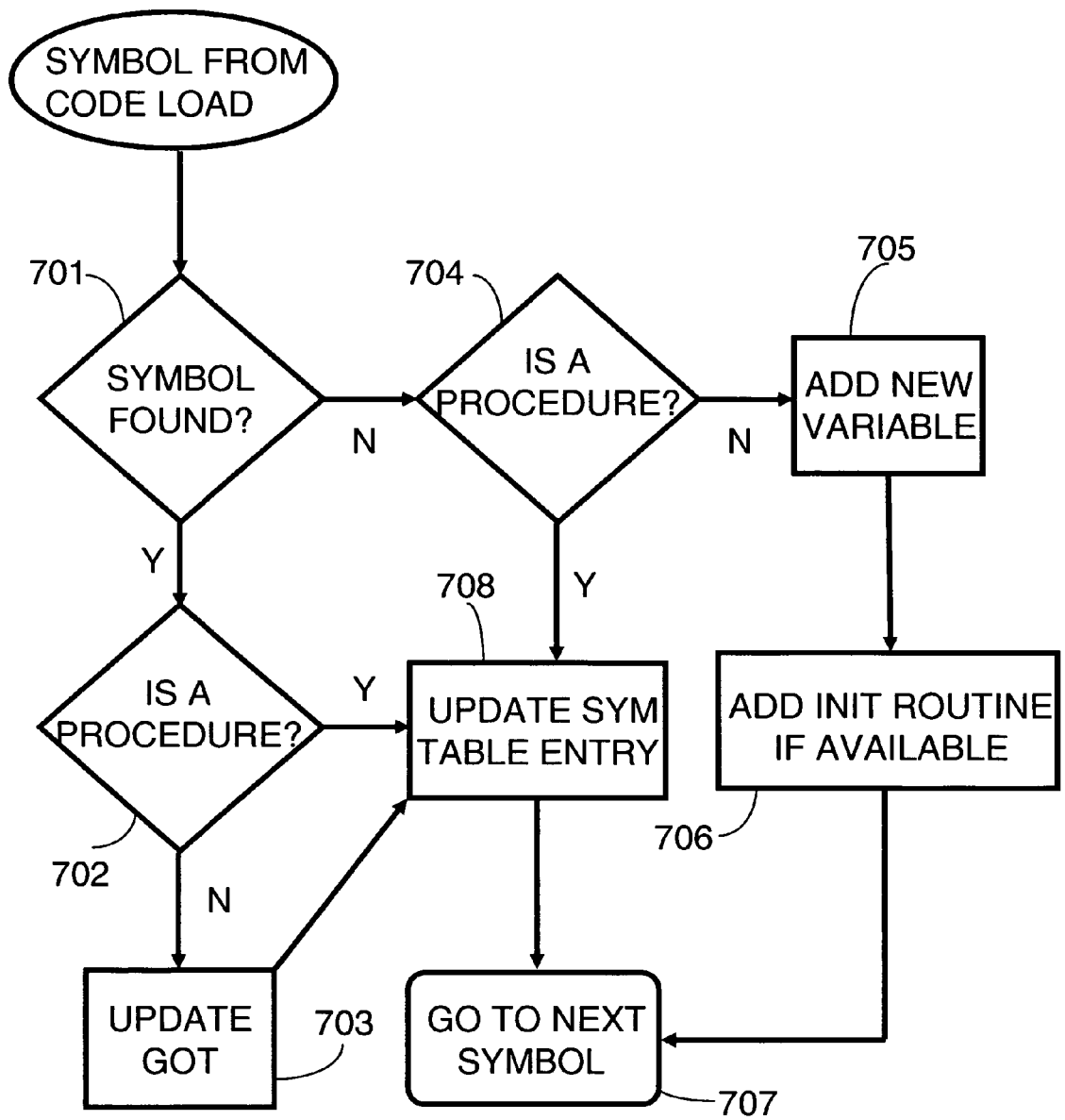
FIG. 7 shows the steps performed by the concurrent loader when processing an entry of the symbol table of the code load.

In the next step 63 each entry in the symbol table 303 of the code load 300 is being processed. This processing step is known as (load-time) relocation and shown in FIG. 7. If (step 701) the symbol name of the entry is found as a symbol name of an entry in the symbol table of the currently executed computer program 200, said symbol table stored in the section of the symbol tables 205 of the computer program code 200, and it is a static variable (when it is not a procedure: step 702) then (step 703) the address as stored in the GOT 202 of the computer program product is stored in the GOT 204 of the new machine code 203 (see FIG. 2b). The associated entries in each GOT are found via the associated entries in the corresponding relocation table: The symbol address is found by searching for the symbol name in the old symbol table of the computer program 200. After step 703, in step 708 the value field 42 of the symbol table entry 40 is updated in the new symbol table of the computer program 200 such that it contains the correct memory address of the static data variable in the section of static data variables 206. Then the next symbol will be processed in step 707.

If step 702 determined that the symbol is a procedure, then in step 708 the value field 42 of the symbol table entry 40 is updated in the new symbol table of the computer program 200 such that it contains the correct memory address of the procedure in the new machine code 203. After step 708 the next symbol will be processed in step 707.

If (step 701) the symbol name of the entry is not found in the symbol table of the currently executed computer program 200, said symbol table stored in the section of symbol tables 205 of the computer program code 200, then it is either a new procedure or a new static data variable (step 704). For a new static data variable the concurrent loader is adding the new static data variable to the new data section 208 of the computer program code 200 (step 705).

In order to achieve this, the value field 42 of the corresponding symbol table entry 40 in the new symbol table of the computer program 200, said new symbol table stored in the section of the symbol tables 205, is updated by the concurrent loader such that it contains the correct memory address. Further, any entries in the GOT 204 of the new machine code 203 pointing to this new variable must be updated. The associated entries in the GOT 204 are found via the associated entries in the corresponding relocation table: The symbol address is found by searching for the symbol name 41 in the previously updated new symbol table of the computer program 200, said symbol table stored in the section of symbol tables 205.

Then the concurrent loader continues to search for an initialisation routine of the new static data variable (step 706). For the preferred embodiment of this invention, such a routine is identified in the symbol table 303 of the code load 300 with a unique naming convention for the symbol name of the associated entry in the symbol table 303; for example a special prefix or postfix string for the symbol name could be used as an indicator. An initialisation routine is linked to the code load 300 such that it is contained in its code section 301. If an initialisation routine is found in the symbol table 303, then its address is copied to a list called the init-routine-list, which is stored in the section 208 for the new static data variables by the concurrent loader.

When a new static data variable is added (step 705) to the new data section 208 of the computer program code 200 then it must be checked if the content of the static data variable is a reference to a procedure. This check is done by searching if there is an entry in the data relocation table stored in the section of the relocation tables 305 of the code load 300 which points into the new variable. If such a data relocation table entry is found, it will be appended to the data relocation table in the section 207 of the relocation tables of the computer program code 200. The relocation offset 51 of the relocation table entry 50 is changed such that it points to the new static data variable.

After the search for an initialisation routine (and its addition when available), the next symbol is processed (step 707). If step 704 determined that the new symbol is a procedure, then in step 708 the value field 42 of the corresponding symbol table entry 40 in the new symbol table of the computer program 200, said symbol table stored in the section of symbol tables 205, is updated by the concurrent loader such that it contains the correct memory address.

In the final step 64 the concurrent loader brings the computer system 10 to a state where the temporary data 209 of the computer program code 200 is not essential to the operation of the computer system 10. For example, this can be achieved by synchronizing all the CPUs 12 such that they all wait on the same place in a machine code. To achieve this, the concurrent loader creates a special work request task with low priority. This ensures that all higher priority tasks are executed before the low priority task starts. This special work request task contains machine code, which lets the CPUs 12 execute a special wait operation.

Once the computer system 10 has reached a state, where the temporary data of the computer program 200 is not essential, the concurrent loader will execute all the initialisation routines from the init-routine-list. Afterwards the init-routine-list will be dropped.

Then the instruction pointers of the CPUs 102 are changed such that they now point to the beginning of the section of new machine code 203. All the CPUs are now triggered to continue their execution using the new machine code 203 instead of the old one 201, which is obsolete.

Since the data section 206 was not touched, and the corresponding entries in the section of the symbol tables 205 are still available, the old static data variables and their content were preserved during the application of the concurrent patch.

Function Descriptor Introduction

Figure 8A:
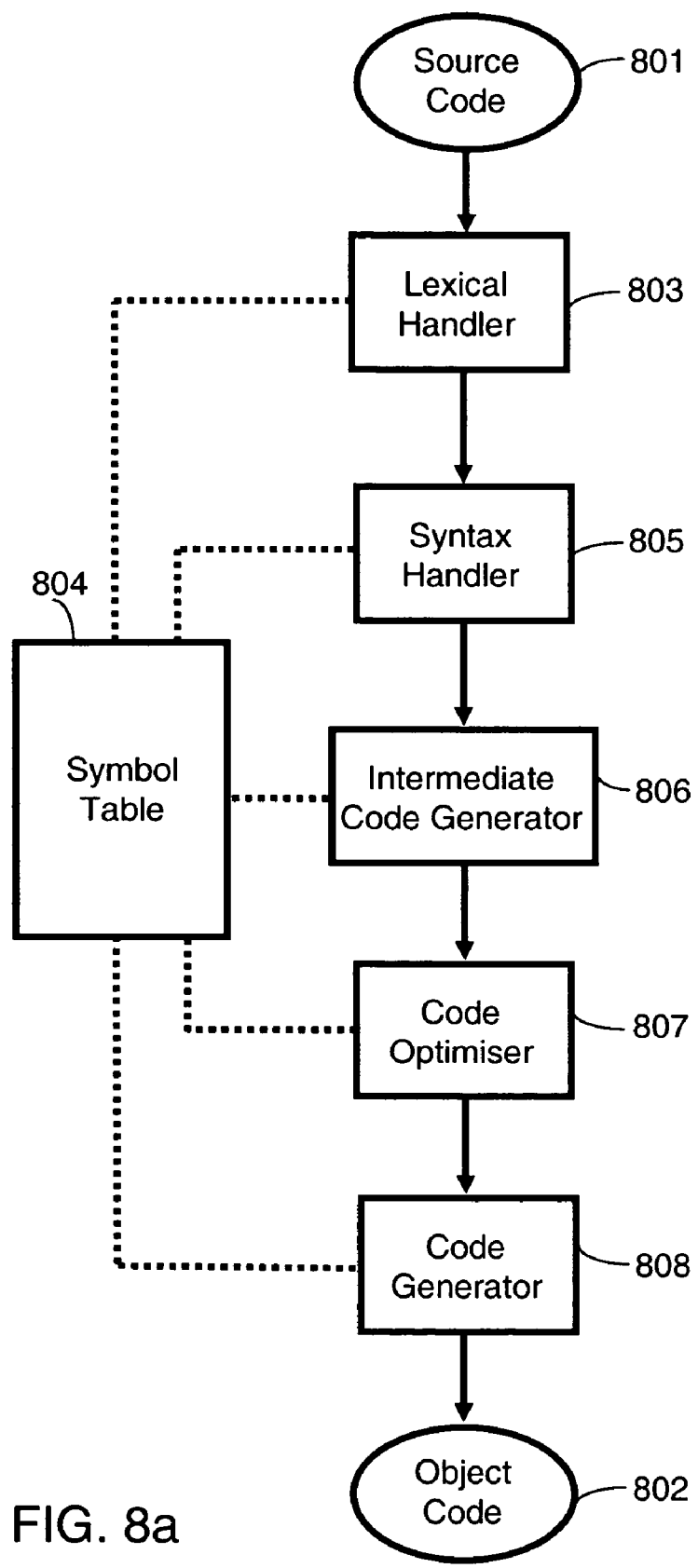
FIG. 8a is a high-level design of a compiler.

In the preferred embodiment of the present invention, an existing compiler is modified to implement the invention. FIG. 8a shows a high-level design of a compiler. The compiler translates a source code 801 of a program to an object code 802 that can be converted by a linker program to a code load 300. A lexical handler 803 generates a symbol table 804 from the source code 801. The source code 801 is then processed by a syntax handler, which tests for the syntactical correctness of the source code 801. Then an intermediate code generator 806 produces an intermediate code representation using the symbol table 804. From this intermediate code representation a code optimiser 807 produces an optimised intermediate code representation. Finally, a code generator 808 generates the object code 802 from the optimised intermediate code representation in the symbol table 802.

The assignment of a function pointer fp of a procedure f to a variable X in the source code 801 will be represented in the intermediate code created by the intermediate code generator 806. The representation of the assignment will be such that the symbol representing the variable X in the symbol table 804 will have an association to an assignment, wherein the assignment contains the address of the procedure f (x:=f).

Figure 8B:
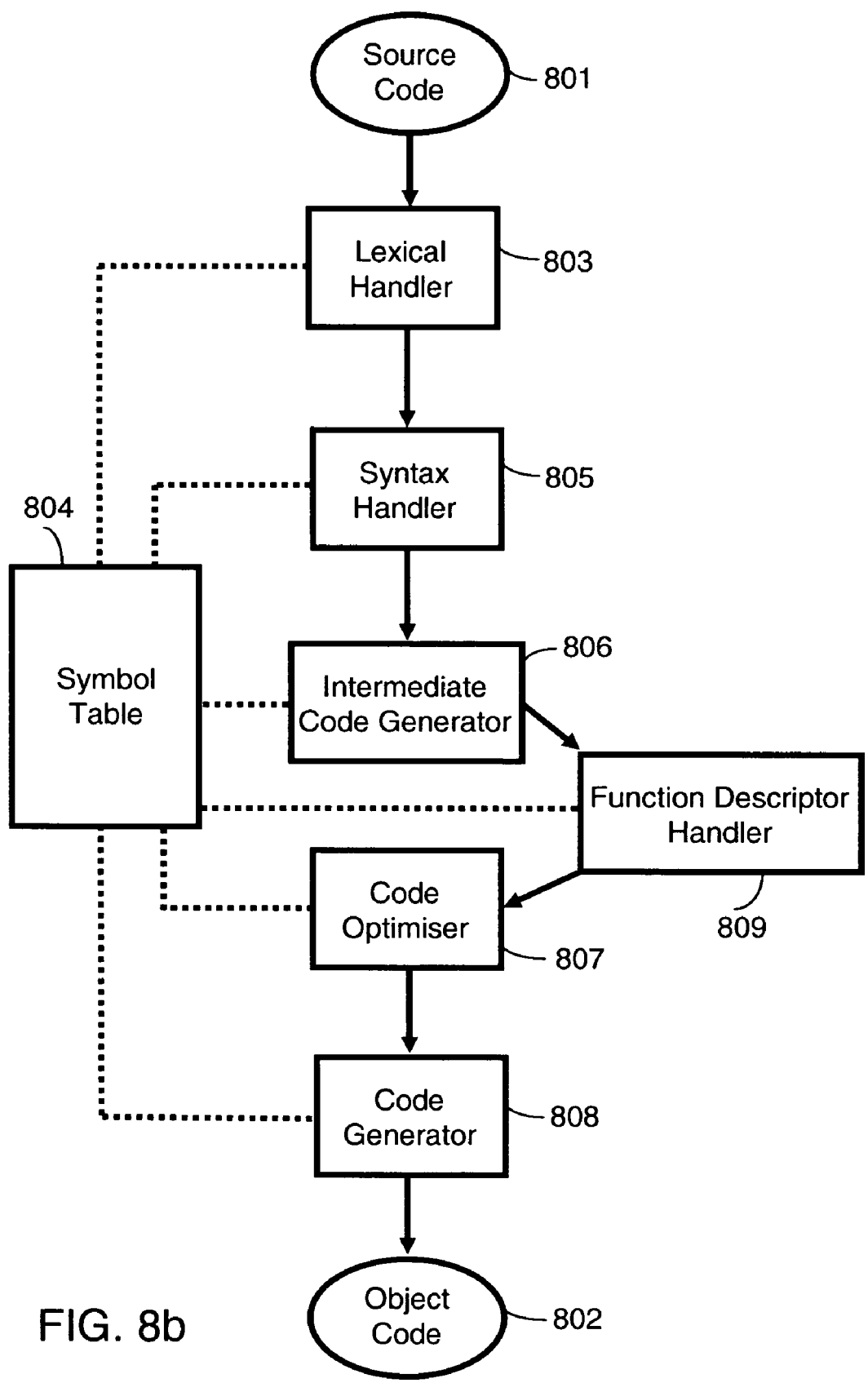
FIG. 8b is a high-level design of a compiler in accordance with the present invention.

A compiler in accordance with the present invention will replace this representation. The replacement is done by a function descriptor handler 809 as shown in FIG. 8b. The function descriptor handler 809 operates on the intermediate code produced by the intermediate code generator 806. The function descriptor handler 809 uses the symbol table 804 to determine whether the assignment mentioned above contains the address of a procedure. For every assignment of a function pointer fp for a procedure f to a variable X in the symbol table 804 the function descriptor handler 809 generates a function descriptor D and replaces the address of the procedure f with the address of the function descriptor D in the assignment associated to X (X:=f is transformed into X:=D). When the function descriptor handler 809 has replaced all the function pointer assignments, the code optimiser 807 continues to operate on the intermediate code as usual.

For the preferred embodiment, a function descriptor D for a procedure f is implemented as a static data variable. The content of the function descriptor D is a single instruction of the instruction set of the CPUs 12. This instruction performs a jump to the address of the procedure f. If the instruction set of the CPUs 12 does not allow such a jump within a single instruction, the function descriptor D contains the required sequence of multiple instructions instead. When the function descriptor handler 809 generates a function descriptor representation in the symbol table 804, then it generates an entry that represents a static variable containing the jump instruction to the address of the procedure f.

If the code optimiser 807 does not eliminate a function descriptor D that was introduced by the function descriptor handler 809, then the function descriptor D will be stored in the object code 802 by the code generator 808. Further, the code generator 808 will generate in the object code 802 a relocation table entry in the relocation table of the data section stored in the section of relocation tables 305 by a linker program. The linker program that is used to generate a code load 300 from the object code 802 will store a function descriptor in the data section 304 of the code load 300.

Relocating Function Descriptors

Since the function descriptors are stored in the data section 304 of the code load 300, they appear as static data variables to the concurrent loader. Therefore, the function descriptors are preserved during the application of a concurrent patch. New function descriptors are added as a new static data variable.

Figure 6B:
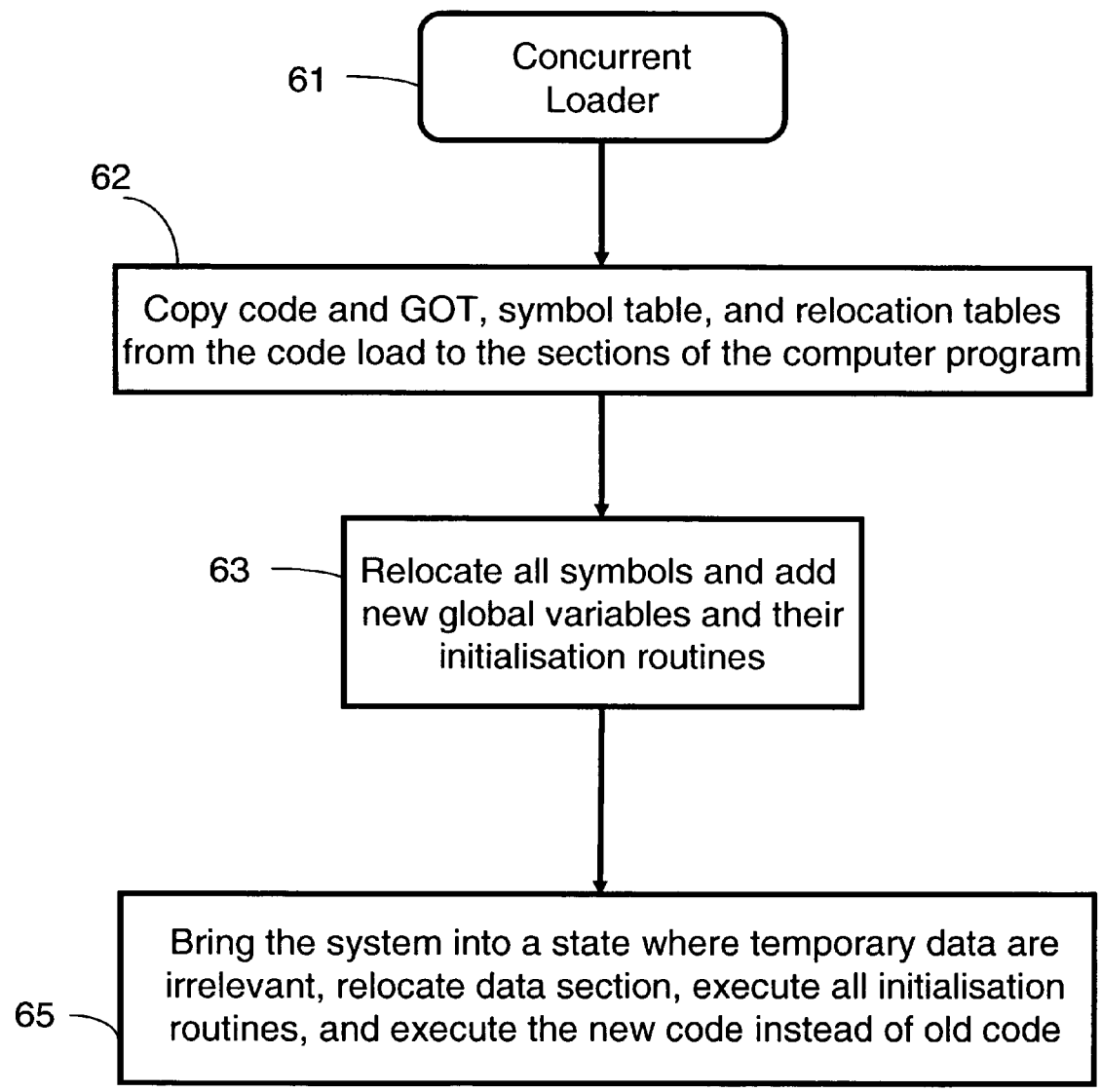
FIG. 6b shows the steps performed by a concurrent loader in accordance with the present invention.

However, in order to support function descriptors the concurrent loader needs to be modified: Step 64 in FIG. 6a will be extended. This extended step 65 is shown in FIG. 6b. Once the concurrent loader has brought the computer system 10 to a state where the temporary data 209 of the computer program code are no more essential to the operation of the computer system 10, the concurrent loader will perform a relocation of the data section 206. This relocation cannot be performed as a background task since the content of the data section 206 is used by the code section 201 during the execution of the computer program 200. Since the new GOT 204 and the new data section 208 are not in use by the code section 201, the relocation of the GOT 204 and the new data section 208 performed in step 63 of FIG. 6a can be done as a background task in parallel to the execution of the computer program 200.

In step 65 the concurrent loader processes each entry 50 in the relocation table of the data section 206, said relocation table stored in the section of the relocation tables 207. During this processing every reference from the data section to a procedure will be replaced by the updated address of the referenced procedure. This relocation works similar to the relocation performed in step 63.

This additional relocation step is an important aspect of the present invention: The additional indirection introduced by a function descriptor enables the regular relocation process to update the address of the procedure automatically during the application of a concurrent patch.

If an entry cannot be relocated, the concurrent loader will cancel the application of the concurrent patch in the preferred embodiment. In another embodiment, a dummy procedure is either added by the function descriptor handler 809 or by the programmer. The concurrent loader will then use this dummy procedure as the relocation target in order to prevent the execution of illegal code.

Since the data section 206 was not touched except to update the existing function descriptors, and the corresponding entries in the section of the symbol tables 205 are still available, the old static data variables and their content were preserved during the application of the concurrent patch.

Figure 9:
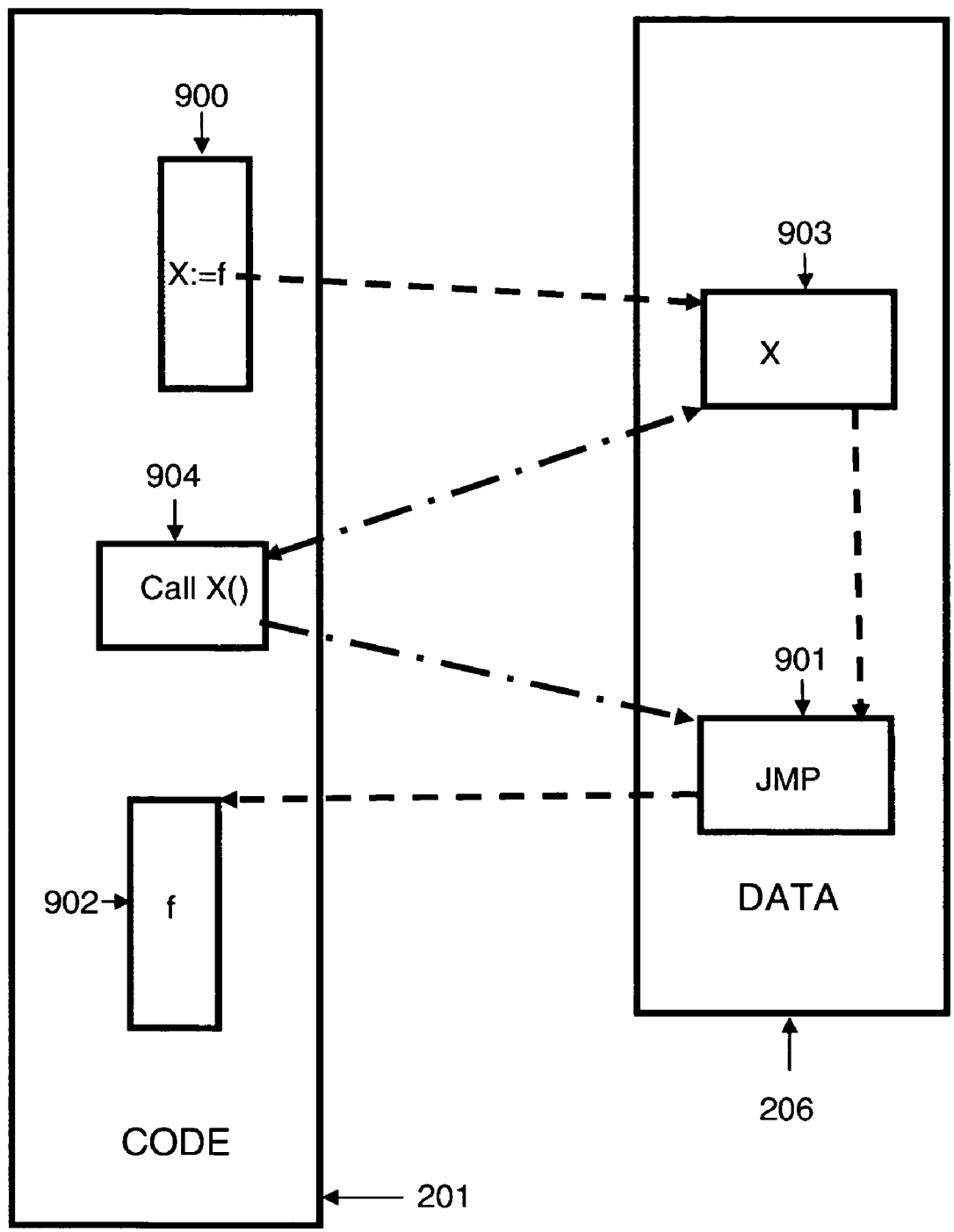
FIG. 9 shows a function descriptor in accordance with the present invention.

FIG. 9 shows the code and data structures that are generated for a function pointer assignment 900 in the code section 201 of a computer program 200. A function descriptor 901 was generated in the data section 206 and initialised with a reference to the procedure 902 before the computer program 200 is executed for the first time and re-initialised by the concurrent loader whenever the address of the procedure 902 changes due to the application of a concurrent patch.

At runtime of the computer program 200 the assignment 900 assigns the address of the function descriptor 901 to the function pointer 903 in the data section 206. A function pointer call 904 of the procedure 902 loads the address of the function descriptor 901 from the function pointer 903 and then transfers control to the function descriptor 901 which then jumps to the procedure 902. Since the function descriptor 901 was re-initialised by the concurrent loader during the application of the concurrent patch, the function descriptor 901 will jump to the current address of the procedure 902.

If the same function pointer for a procedure 902 is assigned to different static data variables, then all these different static data variables contain the address of the same function descriptor 901. When the address of the procedure 902 is updated in the function descriptor 901 during the relocation process, then all the different static data variables containing the address of this function descriptor 901 are affected by this change. This is another important aspect of the present invention: There is no need to perform a separate update for every static data variable that contains the address of the function descriptor 901.

In another embodiment of the invention, an existing linker program is modified to implement the invention. A further embodiment of the invention uses a special program to implement the invention. It is also possible that the concurrent loader is modified in order to implement the invention completely.

This invention is not limited to a computer program code 200 with fixed pre-allocated memory areas for the new machine code 203, the symbol tables 205, the relocation tables 207, and the temporary data section 209. It is also possible to use dynamic memory allocation methods instead.

The invention also works for a computer program code 200 and a code load 300 that do not make use of position independent code. In that case the GOT relocation tables and the GOTs are not needed; instead the references from code to data that need to be resolved are listed in the code relocation table.

While a particular embodiment has been shown and described, various modifications of the present invention will be apparent to those skilled in the art.

As will be appreciated by one skilled in the art, aspects of the present invention may be embodied as a computer system, method or computer program product. Accordingly, aspects of the present invention may take the form of a computer program product comprising a computer usable medium, such as a computer readable medium. The computer readable medium may embody program instructions executable by a computer to implement a method.

The invention claimed is:

1. A method comprising:
generating a code load that is operable to be applied as a concurrent patch to a first computer program product concurrently with its execution on a computer system, the generating comprising:
determining that a reference to a function pointer for a procedure comprises an address of the procedure;
generating a function descriptor for causing a jump to the procedure;
translating the reference to the function pointer for the procedure to a reference to the function descriptor, said function descriptor comprising program instructions executable by said computer system to cause the jump to the procedure; and
storing said function descriptor as the content of a static data variable in the code load.

2. The method of claim 1 further comprising:
loading the code load into a memory of said computer system; and
adding new computer program code and new static data variables while preserving the existing static data variables of said first computer program.

3. The method of claim 2, further comprising:
updating every reference to the procedure in every function descriptor in said new static data variables.

4. The method of claim 2, further comprising:
bringing the computer system into a state where temporary data are irrelevant for the execution of said first computer program; and
updating every reference to the procedure in every function descriptor in said existing static data variables.

5. The method of claim 3, further comprising:
bringing the computer system into a state where temporary data are irrelevant for the execution of said first computer program; and
updating every reference to the procedure in every function descriptor in said existing static data variables.

6. The method of claim 1, wherein the method further comprises applying the code load as a concurrent patch to the first computer program, wherein the applying comprises updating the address of the procedure in the function descriptor during a relocation process to apply the code load as a concurrent patch, and wherein the updating causes a function pointer call of the procedure to load the address of the function descriptor from the function pointer, thereby causing the program instructions of the function descriptor to execute to jump to the procedure.

7. A computer system comprising:
a memory; and
a processor in communications with the memory, wherein the computer system is configured to perform a method, said method comprising:
generating a code load that is operable to be applied as a concurrent patch to a first computer program product concurrently with its execution on the computer system, the generating comprising:
determining that a reference to a function pointer for a procedure comprises an address of the procedure;
generating a function descriptor for causing a jump to the procedure;
translating the reference to the function pointer for the procedure to a reference to the function descriptor, said function descriptor comprising program instructions executable by said computer system to cause the jump to the procedure; and
storing said function descriptor as the content of a static data variable in the code load.

8. The computer system according to claim 7, wherein the method further comprises:
loading the code load into a memory of said computer system; and
adding new computer program code and new static data variables while preserving the existing static data variables of said first computer program.

9. The computer system according to claim 8, wherein the method further comprises:
updating every reference to the procedure in every function descriptor in said new static data variables.

10. The computer system according to claim 8, wherein the method further comprises:

bringing the computer system into a state where temporary data are irrelevant for the execution of said first computer program; and updating every reference to the procedure in every function descriptor in said existing static data variables.

11. The computer system according to claim 9, wherein the method further comprises:

bringing the computer system into a state where temporary data are irrelevant for the execution of said first computer program; and updating every reference to the procedure in every function descriptor in said existing static data variables.

12. The computer system of claim 7, wherein the method further comprises applying the code load as a concurrent patch to the first computer program, wherein the applying comprises updating the address of the procedure in the function descriptor during a relocation process to apply the code load as a concurrent patch, and wherein the updating causes a function pointer call of the procedure to load the address of the function descriptor from the function pointer, thereby causing the program instructions of the function descriptor to execute to jump to the procedure.

13. A computer program product comprising a computer readable medium embodying program instructions executable by a computer to implement a method comprising:

generating a code load that is operable to be applied as a concurrent patch to a first computer program product concurrently with its execution on the computer system, the generating comprising:

determining that a reference to a function pointer for a procedure comprises an address of the procedure;

generating a function descriptor for causing a jump to the procedure;

translating the reference to the function pointer for the procedure to a reference to the function descriptor, said function descriptor comprising program instructions executable by said computer system to cause the jump to the procedure; and storing said function descriptor as the content of a static data variable in the code load.

14. The computer program product according to claim 13, wherein said method further comprises:

loading the code load into a memory of said computer system; and adding new computer program code and new static data variables while preserving the existing static data variables of said first computer program.

15. The computer program product according to claim 14, wherein said method further comprises:

updating every reference to the procedure in every function descriptor in said new static data variables.

16. The computer program product according to claim 14, wherein said method further comprises:

bringing the computer system into a state where temporary data are irrelevant for the execution of said first computer program; and updating every reference to the procedure in every function descriptor in said existing static data variables.

17. The computer program product according to claim 15, wherein said method further comprises:

bringing the computer system into a state where temporary data are irrelevant for the execution of said first computer program; and updating every reference to the procedure in every function descriptor in said existing static data variables.

18. The computer program product of claim 13, wherein the method further comprises applying the code load as a concurrent patch to the first computer program, wherein the applying comprises updating the address of the procedure in the function descriptor during a relocation process to apply the code load as a concurrent patch, and wherein the updating causes a function pointer call of the procedure to load the address of the function descriptor from the function pointer, thereby causing the program instructions of the function descriptor to execute to jump to the procedure.

* * * * *